US012744143B2

(12) United States Patent
Kawamura et al.

(10) Patent No.: US 12,744,143 B2
(45) Date of Patent: Sep. 22, 2026

(54) WOUND CORE

(71) Applicant: NIPPON STEEL CORPORATION, Tokyo (JP)

(72) Inventors: Yusuke Kawamura, Tokyo (JP); Takahito Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 681 days.

(21) Appl. No.: 18/033,110

(22) PCT Filed: Oct. 26, 2021

(86) PCT No.: PCT/JP2021/039518
§ 371 (c)(1),
(2) Date: Apr. 21, 2023

(87) PCT Pub. No.: WO2022/092095
PCT Pub. Date: May 5, 2022

(65) Prior Publication Data

US 2023/0395293 A1 Dec. 7, 2023

(30) Foreign Application Priority Data

Oct. 26, 2020 (JP) ................................ 2020-178891

(51) Int. Cl.
*H01F 3/02* (2006.01)
*H01F 1/147* (2006.01)

(52) U.S. Cl.
CPC ........... *H01F 3/02* (2013.01); *H01F 1/14775* (2013.01)

(58) Field of Classification Search
CPC .......... C21D 1/26; C21D 1/76; C21D 8/1272; C21D 8/1294; C22C 38/008; C22C 38/02;
(Continued)

(56) References Cited

U.S. PATENT DOCUMENTS 6,562,473 B1 * 5/2003 Okabe ................ H01F 1/14775 148/310
2013/0213525 A1 8/2013 Shingaki et al.
(Continued)

FOREIGN PATENT DOCUMENTS

AU 2012337260 A1 5/2014
EP 3 570 305 A1 11/2019
(Continued)

*Primary Examiner* — Julian D Huffman
(74) *Attorney, Agent, or Firm* — Birch, Stewart, Kolasch & Birch, LLP

(57) ABSTRACT

Provided is a wound core including: a substantially rectangular wound core main body in a side view, in which the wound core main body includes a portion in which grain-oriented electrical steel sheets in which planar portions and corner portions are alternately continuous in a longitudinal direction and an angle formed by two planar portions adjacent to each other with each of the corner portions therebetween is 90° are stacked in a sheet thickness direction and has a substantially rectangular laminated structure in a side view, each of the corner portions has two or more bent portions having a curved shape in a side view of the grain-oriented electrical steel sheets 1, the sum of bent angles of the bent portions present in one corner portion is 90°, each bent portion in a side view has an inner side radius of curvature r of 1 mm to 5 mm, and interlaminar friction coefficients which are dynamic friction coefficients of the laminated grain-oriented electrical steel sheets in at least some of the planar portions are 0.20 or more.

3 Claims, 6 Drawing Sheets

(58) Field of Classification Search
CPC ......... C22C 38/04; C22C 38/06; C22C 38/08; C22C 38/12; C22C 38/14; C22C 38/16
See application file for complete search history.

(56) References Cited

U.S. PATENT DOCUMENTS

| | | | |
|---|---|---|---|
| 2019/0333662 A1 | 10/2019 | Terashima et al. | |
| 2024/0096540 A1* | 3/2024 | Kawamura | ......... H01F 1/14775 |

FOREIGN PATENT DOCUMENTS

| | | | |
|---|---|---|---|
| EP | 3 101 667 B1 | 12/2019 |
| JP | 11-124685 A | 5/1999 |
| JP | 2001-192785 A | 7/2001 |
| JP | 2005-240079 A | 9/2005 |
| JP | 2005-286169 A | 10/2005 |
| JP | 2011-90456 A | 5/2011 |
| JP | 2012-52229 A | 3/2012 |
| JP | 6224468 B2 | 11/2017 |
| JP | 2018-148036 A | 9/2018 |
| WO | WO 2013/074268 A1 | 5/2013 |
| WO | WO 2018/123339 A1 | 7/2018 |

* cited by examiner

WOUND CORE

TECHNICAL FIELD

The present invention relates to a wound core. Priority is claimed on Japanese Patent Application No. 2020-178891, filed Oct. 26, 2020, the content of which is incorporated herein by reference.

BACKGROUND ART

A grain-oriented electrical steel sheet is a steel sheet containing 7 mass % or less of Si and has a secondary recrystallization texture in which secondary recrystallization grains are concentrated in the {110}<001> orientation (Goss orientation). Magnetic properties of grain-oriented electrical steel sheets are greatly affected by the degree of concentration in the {110}<001> orientation. In recent years, grain-oriented electrical steel sheets that have been put into practical use, the angle between the crystal <001> direction and the rolling direction is controlled to fall within a range of about 5°.

Grain-oriented electrical steel sheets are laminated and used in iron cores of transformers or the like. In addition to the main magnetic properties of high magnetic flux density and low iron loss, small magneto-striction, which causes vibration and noise, is also required. Crystal orientation is known to have a strong correlation with these properties, and for example, Patent Documents 1 to 3 disclose precise orientation control techniques.

Furthermore, Patent Document 4 considering an influence on strain or the like occurring during processing has been disclosed as a technique for improving properties by controlling a dynamic friction coefficient of the surface of a grain-oriented electrical steel sheet. Patent documents 5 and 6 and the like have been disclosed as noise improvement techniques by controlling a dynamic friction coefficient of the surface of steel sheets laminated as an iron core.

In addition, in the related art, for wound core production as described in, for example, Patent Document 7, a method of winding steel sheets are into a cylindrical shape, then pressing the cylindrical laminated body without change so that corner portions thereof have a constant curvature, forming it into a substantially rectangular shape, then performing annealing to remove strain and maintain the shape is widely known.

On the other hand, as other methods of producing a wound core, techniques such as those in Patent Documents 8 to 10 have been disclosed in which steel sheet portions that will be corner portions of a wound core are bent in advance so that a relatively small bending area with a radius of curvature of 3 mm or less is formed, and the bent steel sheets are laminated to form a wound core. According to these production methods, a conventional large-scale pressing process is not required, the steel sheets are precisely bent to maintain the shape of an iron core, and strain occurring during processing is also concentrated at only the bent portions (corner portions). For this reason, it becomes possible to omit the strain relief due to the above annealing process, industrial advantages are great, and the application is progressing.

CITATION LIST

Patent Documents

[Patent Document 1]
Japanese Unexamined Patent Application, First Publication No. 2001-192785

[Patent Document 2]
Japanese Unexamined Patent Application, First Publication No. 2005-240079

[Patent Document 3]
Japanese Unexamined Patent Application, First Publication No. 2012-052229

[Patent Document 4]
Japanese Unexamined Patent Application, First Publication No. H11-124685

[Patent Document 5]
PCT International Publication No. WO2018/123339

[Patent Document 6]
Japanese Unexamined Patent Application, First Publication No. 2011-90456

[Patent Document 7]
Japanese Unexamined Patent Application, First Publication No. 2005-286169

[Patent Document 8]
Japanese Patent No. 6224468

[Patent Document 9]
Japanese Unexamined Patent Application, First Publication No. 2018-148036

[Patent Document 10]
Australian Patent Application, Publication No. 2012337260

SUMMARY OF THE INVENTION

Problems to be Solved by the Invention

An object of the present invention is to provide a wound core which is produced through a method of bending steel sheets in advance so as to form a relatively small bending area with a radius of curvature of 5 mm or less and laminating the bent steel sheets to form a wound core and improved such that generation of noise caused by a combination of the shape of the iron core and the steel sheets used is minimized.

Means for Solving the Problem

The inventors of the present application have studied in detail the noise characteristics of a transformer iron core produced through a method of bending steel sheets in advance so as to form a relatively small bending area with a radius of curvature of 5 mm or less and laminating the bent steel sheets to form a wound core. As a result, it has been recognized that, even if steel sheets with substantially the same crystal orientation control and substantially the same magneto-striction magnitude measured on a single sheet are used as materials, there may be a difference in iron core noise.

As a result of investigating the cause of this problem, it has been found that the difference in the problematic noise is affected by the surface condition of materials, and that the degree of the phenomenon also varies depending on the dimensions and shapes of iron cores.

In this regard, various steel sheet production conditions and the shapes of iron cores have been studied and their influences on noise have been classified. As a result, it has been found that steel sheets produced under specific production conditions can be used as materials for iron cores with specific dimensions and shapes to minimize noise of the iron cores.

In order to achieve the object, the present invention employs the following aspect.

That is, one aspect of the present invention is a wound core including: a substantially rectangular wound core main body in a side view, in which the wound core main body includes a portion in which grain-oriented electrical steel sheets in which planar portions and corner portions are alternately continuous in a longitudinal direction and an angle formed by two planar portions adjacent to each other with each of the corner portions therebetween is 90° are stacked in a sheet thickness direction and has a substantially rectangular laminated structure in a side view, each of the corner portions has two or more bent portions having a curved shape in a side view of the grain-oriented electrical steel sheets, and the sum of bent angles of the bent portions present in one corner portion is 90°, each bent portion in a side view has an inner side radius of curvature r of 1 mm to 5 mm, the grain-oriented electrical steel sheets have a chemical composition containing, in mass %, Si: 2.0% to 7.0%, with the remainder being Fe and impurities, and have a texture oriented in the Goss orientation, more than half of measurement values obtained at a plurality of different lamination thickness positions are 0.20 to 0.70 for interlaminar friction coefficients which are dynamic friction coefficients of the laminated grain-oriented electrical steel sheets in at least some of the planar portions, and an average value thereof is 0.20 to 0.70.

In addition, in the aspect, it is preferable that a standard deviation of magneto-striction λpp of the grain-oriented electrical steel sheets be $0.01\times10^{-6}$ to $0.10\times10^{-6}$.

However, the standard deviation is determined by a peak-to-peak value of the magneto-striction measured at the planar portions of each of a plurality of arbitrary grain-in oriented electrical steel sheets taken out from the laminated grain-oriented electrical steel sheets.

In addition, in the aspect, it is preferable that, in the planar portions, the proportion of the area where the grain-oriented electrical steel sheets face each other with an interlayer friction coefficient of 0.20 or more be 50% or higher of the total area where the grain-oriented electrical steel sheets are laminated and face each other.

In addition, in the aspect, it is preferable that the interlaminar friction coefficient of the laminated grain-oriented electrical steel sheets in a region within 50% of the thickness of the laminated grain-oriented electrical steel sheets from an inner side of the wound core in the planar portions be 0.20 to 0.70.

Effects of the Invention

According to the above aspect of the present invention, in a wound core formed by laminating bent grain-oriented electrical steel sheets, it is possible to effectively minimize the generation of noise caused by the combination of the shape of the iron core and the steel sheets used.

EMBODIMENTS FOR IMPLEMENTING THE INVENTION

Figure 1:
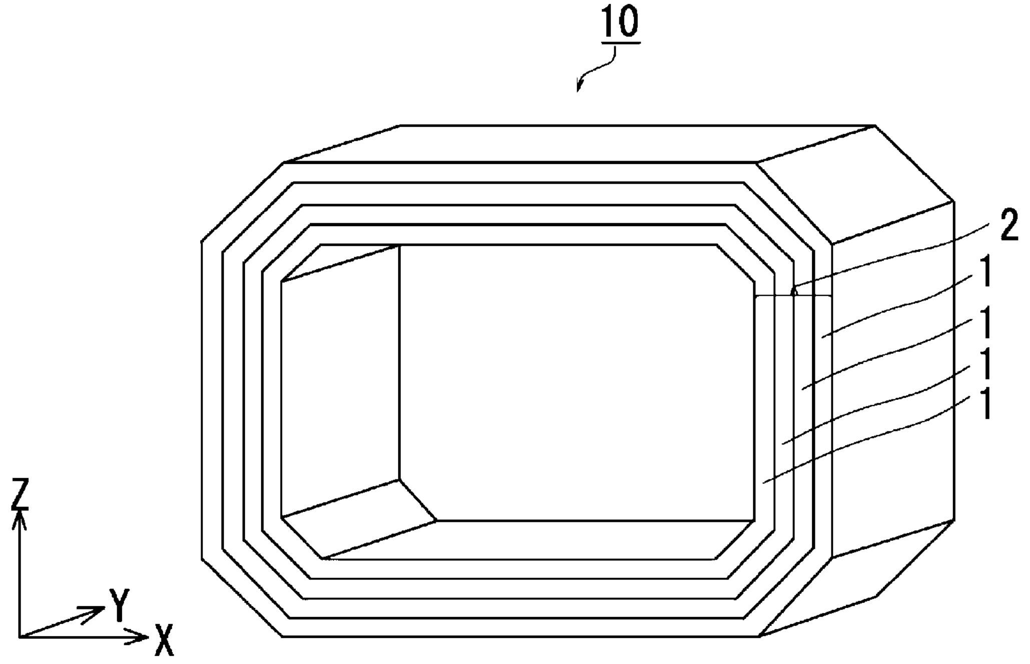
FIG. 1 is a perspective view schematically showing one embodiment of a wound core according to the present invention.

Hereinafter, embodiments of wound cores according to the present invention will be sequentially described in detail. However, the present invention is not limited to the configurations disclosed in these embodiments, and can be variously modified without departing from the gist of the present invention. A lower limit value and an upper limit value are included in a numerical limit range described below. A numerical value represented by "more than" or "less than" is not included in the numerical range. In addition, "%" relating to chemical composition means "mass %" unless otherwise specified.

In addition, terms such as "parallel," "perpendicular," "identical," and "right angle" and length and angle values used in this specification to specify shapes, geometric conditions and their extents are not bound by strict meanings, and should be interpreted to include the extent to which similar functions can be expected.

In addition, "grain-oriented electrical steel sheet" in this specification is sometimes simply described as "steel sheet" or "electrical steel sheet," and "wound core" is sometimes simply described as "iron core."

A wound core according to an embodiment of the present invention is a wound core including: a substantially rectangular wound core main body in a side view, in which the wound core main body includes a portion in which grain-oriented electrical steel sheets in which planar portions and corner portions are alternately continuous in a longitudinal direction and an angle formed by two planar portions adjacent to each other with each of the corner portions therebetween is 90° are stacked in a sheet thickness direction and has a substantially rectangular laminated structure in a side view, each of the corner portions has two or more bent portions having a curved shape in a side view of the grain-oriented electrical steel sheets, the sum of bent angles of the bent portions present in one corner portion is 90°, each bent portion in a side view has an inner side radius of curvature r of 1 mm to 5 mm, the grain-oriented electrical steel sheets have a chemical composition containing, in mass %, Si: 2.0% to 7.0%, with the remainder being Fe and impurities, and have a texture oriented in the Goss orientation, more than half of measurement values obtained at a plurality of different lamination thickness positions are 0.20 to 0.70 for interlaminar friction coefficients which are dynamic friction coefficients of the laminated grain-oriented electrical steel sheets in at least some of the planar portions, and an average value thereof is 0.20 to 0.70.

1. Shapes of wound cores and grain-oriented electrical steel sheets

First, the shapes of wound cores according to embodiments of the present invention will be described. The shapes of wound cores and grain-oriented electrical steel sheets described here are not particularly new. For example, the shapes merely correspond to the shapes of known wound cores and grain-oriented electrical steel sheets introduced in Patent Documents 8 to 10 in Background Art.

Figure 2:
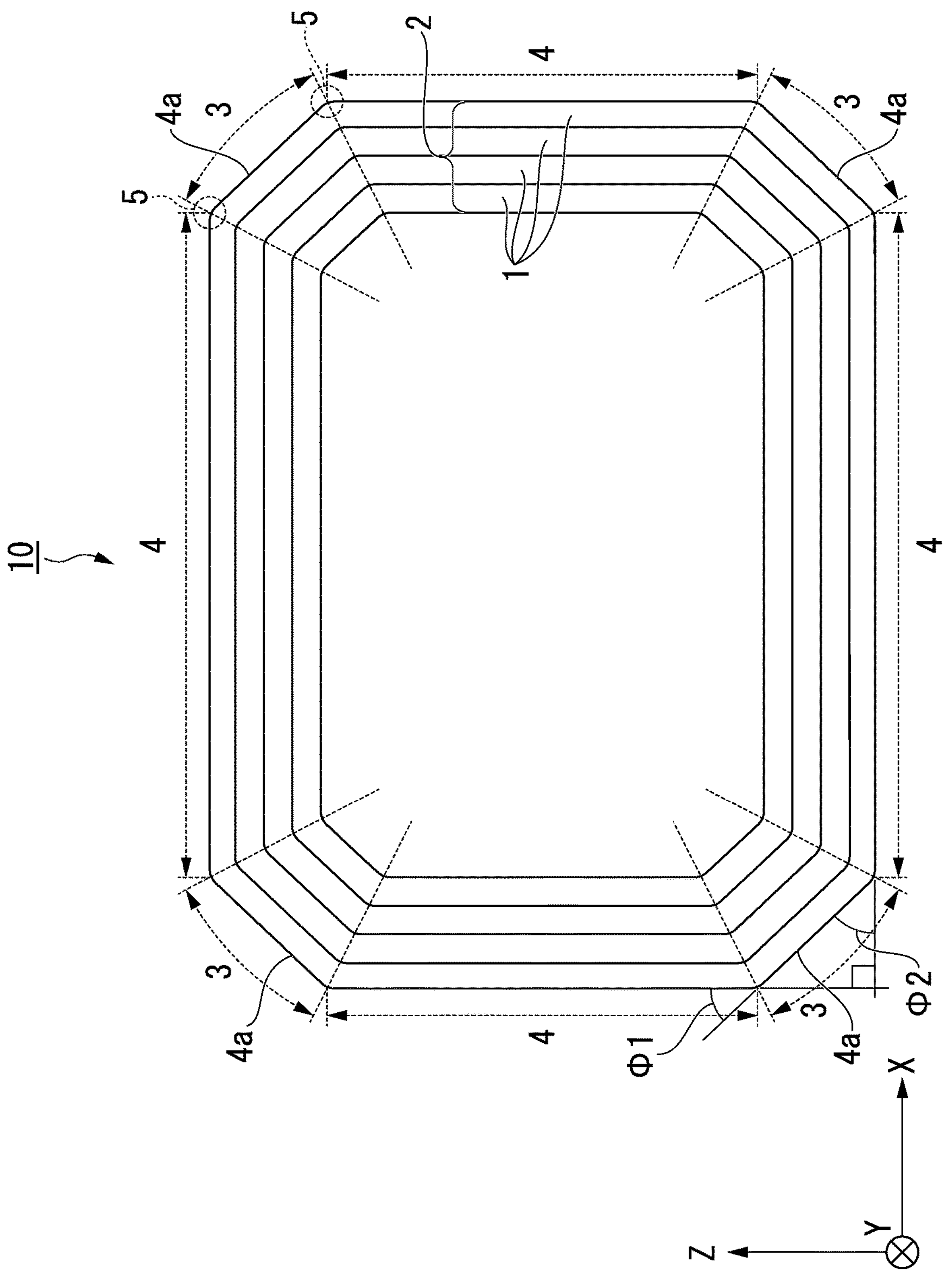
FIG. 2 is a side diagram of the wound core shown in the embodiment of FIG. 1.
Figure 3:
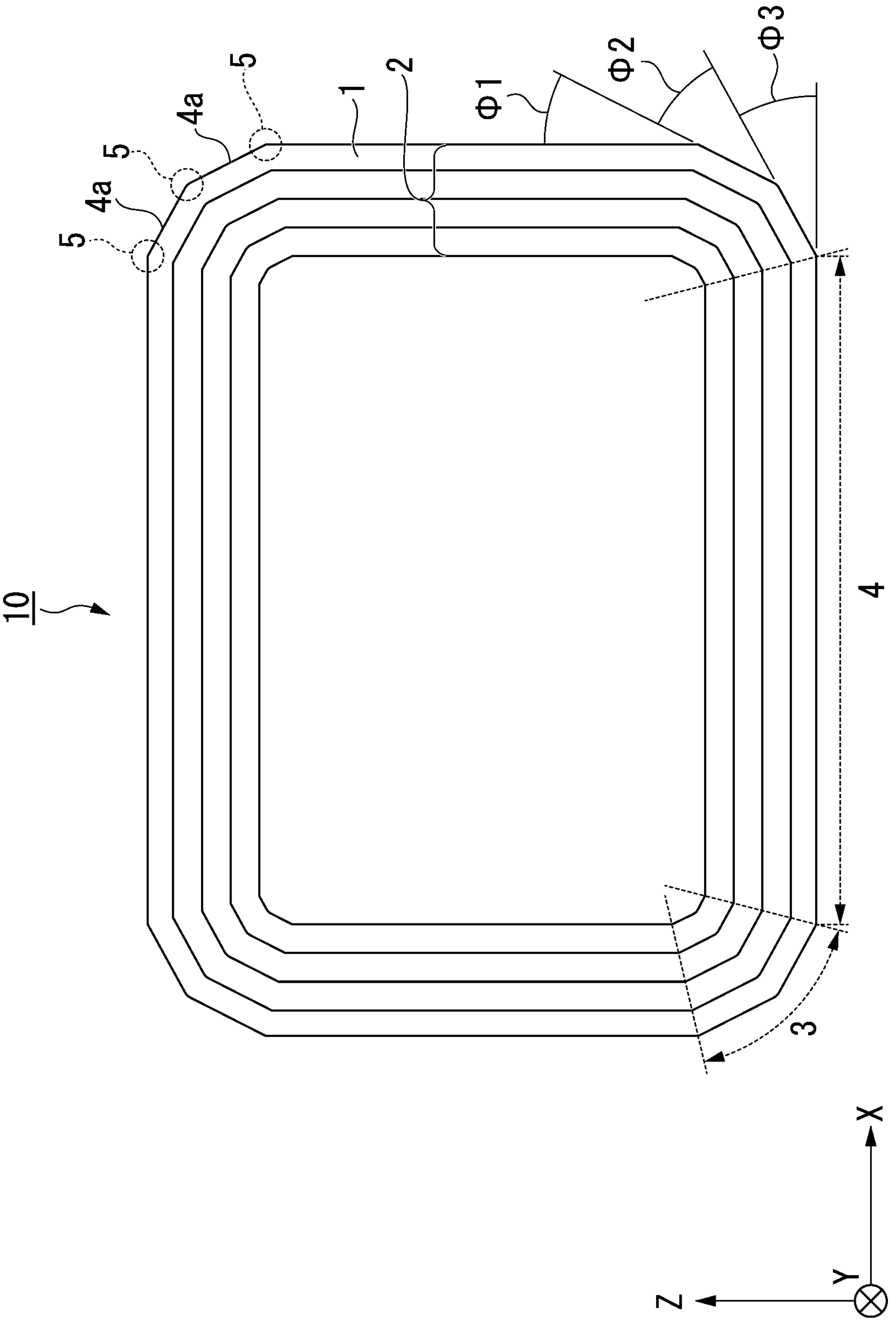
FIG. 3 is a side diagram schematically showing another embodiment of a wound core according to the present invention.

FIG. 1 is a perspective view schematically showing one embodiment of a wound core. FIG. 2 is a side diagram of the wound core shown in the embodiment of FIG. 1. In addition, FIG. 3 is a side diagram schematically showing another embodiment of a wound core.

In this specification, the side view refers to viewing in the width direction (the Y-axis direction in FIG. 1) of long shape grain-oriented electrical steel sheets constituting the wound core, and the side diagram is a diagram (diagram in the Y-axis direction in FIG. 1) showing a shape visible from the side view.

The wound cores according to the embodiments of the present invention include a substantially rectangular wound core main body in a side view. The wound core main body has a substantially rectangular laminated structure in a side view in which grain-oriented electrical steel sheets are stacked in a sheet thickness direction. The wound core main body may be used as a wound core as it is or may have well-known fasteners such as a binding band as necessary to integrally fix a plurality of grain-oriented electrical steel sheets stacked.

In this specification, the iron core length of the wound core main body is not particularly limited, but even if the iron core length of the iron core changes, the volume of the bent portions is constant, so iron loss generated in the bent portions is constant. The longer the iron core length, the smaller the volume fraction of the bent portions, and length is preferably 1.5 m or longer and more preferably 1.7 m or longer. In the present invention, the iron core length of the wound core main body is a circumferential length of the wound core main body at the central point in the laminating direction in a side view.

In addition, in this specification, the thickness of the laminated steel sheets of the wound core main body is not particularly limited. Since the effect of the present invention is thought to be caused by uneven distribution of excitation magnetic flux in the iron core depending on the thickness of the laminated steel sheets to a central region of the iron core as will be described below, the advantages of the invention are likely to be obtained in an iron core with a thick lamination thickness of the steel sheets where uneven distribution is likely to occur. For this reason, the thickness of the laminated steel sheets is preferably 40 mm or more and more preferably 50 mm or more. In the present invention, the thickness of the laminated steel sheets of the wound core main body is a maximum thickness in the laminating direction in a planar portion of the wound core main body in a side view.

Although the wound cores according to the embodiments of the present invention can also be suitably used for any of the conventionally known applications, they have significant advantages in iron cores for transmission transformers in which noise is problematic.

As shown in FIGS. 1 and 2, a wound core main body 10 includes a portion in which grain-oriented electrical steel sheets 1 in which first planar portions 4 and corner portions 3 are alternately continuous in a longitudinal direction and an angle formed by two first planar portions 4 adjacent to each other with each of the corner portions 3 therebetween is 90° are stacked in a sheet thickness direction and has a substantially rectangular laminated structure 2 in a side view. In this specification, "first planar portion" and "second planar portion" each may be simply described as "planar portion."

Each of the corner portions 3 of the grain-oriented electrical steel sheets 1 has two or more bent portions 5 having a curved shape in a side view of the grain-oriented electrical steel sheets, and the sum of bent angles of the bent portions present in one corner portion 3 is 90°. A corner portion 3 has a second planar portion 4*a* between adjacent bent portions 5, 5. Accordingly, the corner portion 3 has a configuration including two or more bent portions 5 and one or more second planar portions 4*a*.

The embodiment of FIG. 2 is a case where one corner portion 3 has two bent portions 5. The embodiment of FIG. 3 is a case where one corner portion 3 has three bent portions 5.

As shown in these examples, in the present invention, one corner portion can be formed with two or more bent portions, but each of bent angles φ (φ1, φ2, and φ3) of a bent portion 5 is preferably 60° or less and more preferably 45° or less from the viewpoint of minimizing iron loss by minimizing generation of strain due to deformation during processing.

In the embodiment of FIG. 2 in which one corner portion has two bent portions, it is possible to set, for example, φ1=60° and φ2=30° or φ1=45° and φ2=45° from the viewpoint of reducing iron loss. In addition, in the embodiment of FIG. 3 in which one corner portion has three bent portions, it is possible to set, for example, 01=30°, ¢2=30°, and φ3=30° from the viewpoint of reducing iron loss. Furthermore, the folding angles are preferably equal from the viewpoint of production efficiency. Therefore, it is preferable to set φ1=45° and φ2=45° in a case where one corner portion has two bent portions, and it is preferable to set, for example, φ1=30°, 2=30°, and φ3=30° from the viewpoint of reducing iron loss in the embodiment of FIG. 3 in which one corner portion has three bent portions.

Figure 6:
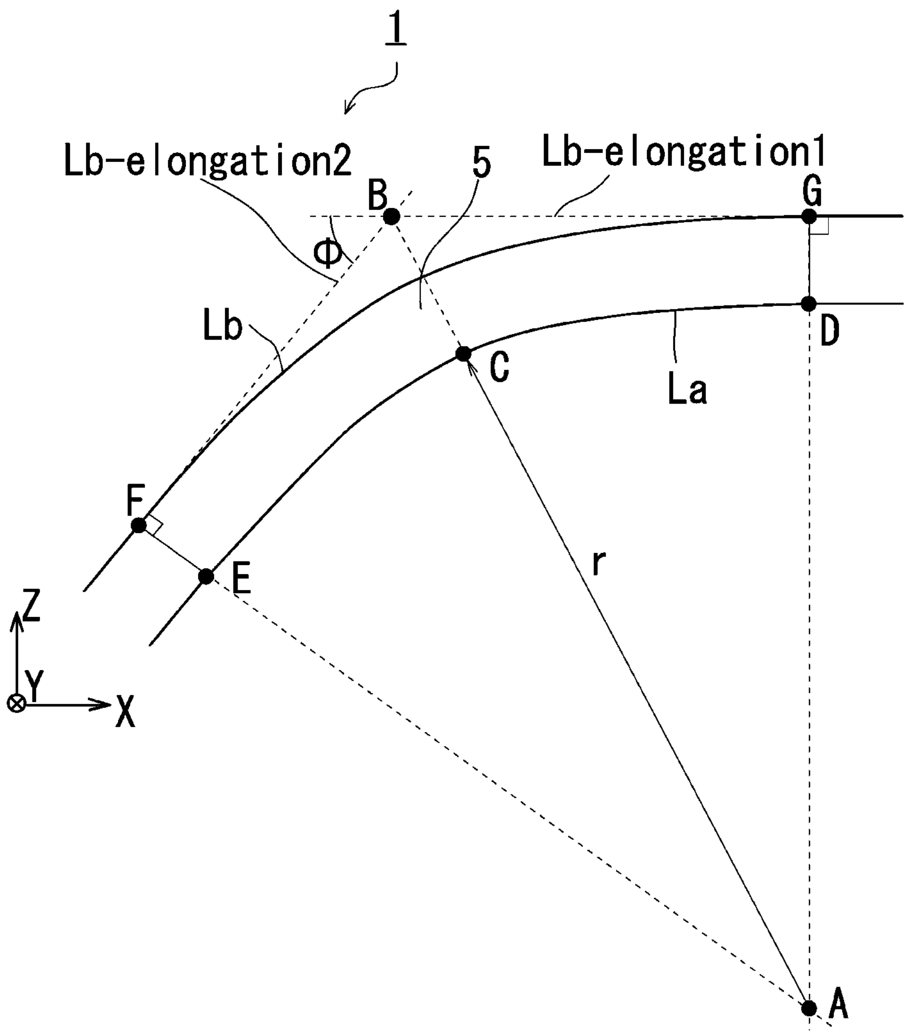
FIG. 6 is a side diagram schematically showing one example of a bent portion of a grain-oriented electrical steel sheet constituting a wound core according to an embodiment of the present invention.

The bent portion 5 will be described in more detail with reference to FIG. 6. FIG. 6 is a diagram schematically showing one example of a bent portion (curved portion) of a grain-oriented electrical steel sheet. The bent angle of the bent portion means an angle difference between a front straight portion and a rear straight portion in the bending direction in the bent portion of the grain-oriented electrical steel sheet and is expressed as an angle φ of a supplementary angle of an angle formed by two virtual lines Lb-elongation1 and Lb-elongation2 obtained by extending linear portions that are surfaces of planar portions on both sides sandwiching the bent portion on the outer surface of the grain-oriented electrical steel sheet.

At this time, a point where an extended straight line separates from the surface of the steel sheet is a boundary between a planar portion and a bent portion on the surface on the outer side of the steel sheet, and is a point F and a point G in FIG. 6.

Furthermore, straight lines perpendicular to the outer surface of the steel sheet respectively extend from the points F and G, and intersections with the inner surface of the steel sheet are respectively a point E and a point D. Each of the points E and D is a boundary between a planar portion and a bent portion on the inner surface of the steel sheet.

In this specification, in a side view of the grain-oriented electrical steel sheet, the bent portion is a portion of the grain-oriented electrical steel sheet surrounded by the above points D, E, F, and G. In FIG. 6, the surface of the steel sheet between the points D and E, that is, the inner surface of the bent portion, is indicated by La, and the surface of the steel sheet between the points F and G, that is, the outer surface of the bent portion, is indicated by Lb. In addition, an intersection on an arc DE inside the bent portion of the steel sheet when the points A and B are connected by a straight line is set to C.

In addition, the inner side radius of curvature r in a side view of the bent portion 5 is shown in FIG. 6. The radius of curvature r of the bent portion 5 is obtained by approximating the above La with the arc passing through the points E and D. The smaller the radius of curvature r, the sharper the curvature of the curved portion of the bent portion 5, and the larger the radius of curvature r, the gentler the curvature of the curved portion of the bent portion 5.

In the wound core according to the embodiment of the present invention, the radius of curvature r at each bent portion 5 of each grain-oriented electrical steel sheet 1 laminated in the sheet thickness direction may vary to some extent. This variation may be due to molding accuracy, and unintended variation may occur due to handling or the like during lamination. Such an unintended error can be minimized to about 0.2 mm or less in current normal industrial production. In a case where such variations are large, a representative value can be obtained by measuring the radius of curvature of a sufficiently large number of steel sheets and averaging them. In addition, it is thought that the radius of curvature could be intentionally changed for some reason, and the present invention does not exclude such a form.

The method of measuring the inner side radius of curvature r of the bent portion 5 is not particularly limited, but the inner side radius of curvature can be measured through observation with a commercially available microscope (Nikon ECLIPSE LV150) at a magnification of 200. Specifically, the curvature center point A is obtained from the observation results. As a method of obtaining this, for example, if the intersection of the line segment EF and the line segment DG extending inward on the side opposite to the point B is defined as A, the size of the inner side radius of curvature r corresponds to the length of the line segment AC.

In this specification, noise of the wound core can be minimized by setting the inner side radius of curvature r of the bent portion to be within a range of 1 mm to 5 mm and combining with a specific grain-oriented electrical steel sheet with a controlled interlaminar friction coefficient described below. The effect of this specification is more significantly exhibited when the inner side radius of curvature r of the bent portion is preferably 3 mm or less.

In addition, it is the most preferable form that all bent portions existing in the iron core satisfy having the inner side radius of curvature r defined in this specification. In a case where there is a bent portion satisfying having the inner side radius of curvature r according to the embodiment of the present invention and a bent portion not satisfying having the inner side radius of curvature r according to the embodiment of the present invention, at least half of the bent portions desirably satisfy having the inner side radius of curvature r defined in the present invention.

Figure 4:
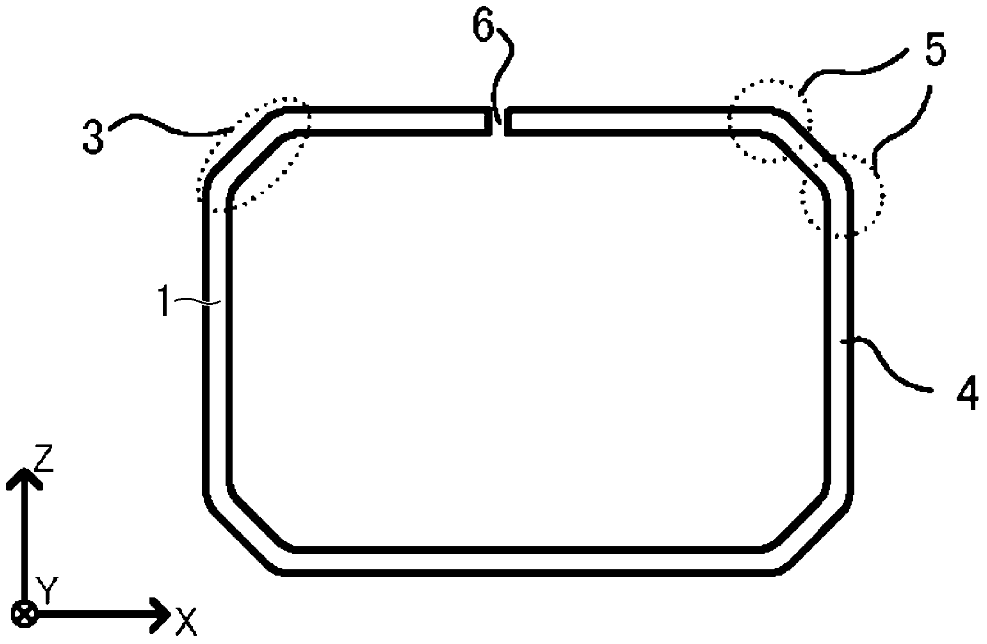
FIG. 4 is a side diagram schematically showing one example of a single-layer grain-oriented electrical steel sheet constituting a wound core according to an embodiment of the present invention.
Figure 5:
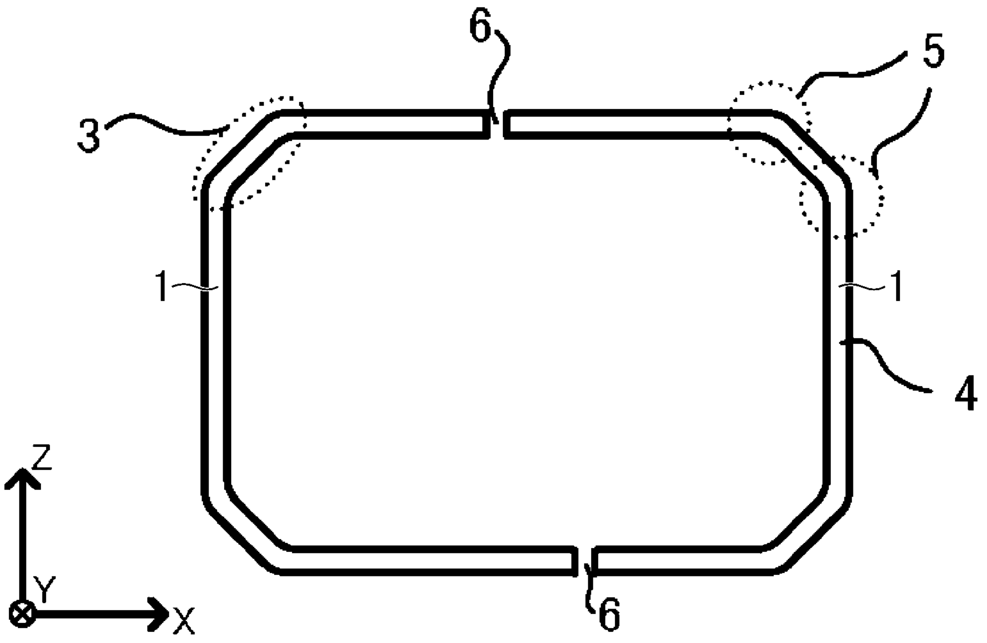
FIG. 5 is a side diagram schematically showing another example of a single-layer grain-oriented electrical steel sheet constituting a wound core according to an embodiment of the present invention.

FIGS. 4 and 5 are diagrams each schematically showing one example of a single-layer grain-oriented electrical steel sheet in a wound core main body. As shown in the examples of FIGS. 4 and 5, the grain-oriented electrical steel sheet used in the present invention is bent, has a corner portion 3, composed of two or more bent portions 5, and a planar portion 4, and forms a substantially rectangular ring in a side view via a joining part 6 which is an end surface of one or more grain-oriented electrical steel sheets in the longitudinal direction.

In this specification, it is sufficient as long as the wound core main body has a laminated structure 2 with a substantially rectangular shape as a whole in a side view. One grain-oriented electrical steel sheet may form one layer of the wound core main body via one joining part 6 as shown in the example of FIG. 4. Alternatively, one grain-oriented electrical steel sheet may form about half the circumference of a wound core and two grain-oriented electrical steel sheets may constitute one layer of the wound core main body via two joining parts 6 as shown in the example of FIG. 5.

The thickness of a grain-oriented electrical steel sheet used in this specification is not particularly limited and may be appropriately selected depending on applications and the like, but is usually within a range of 0.15 mm to 0.35 mm and preferably within a range of 0.18 to 0.23 mm.

2. Configuration of Grain-Oriented Electrical Steel Sheets

Next, the configuration of grain-oriented electrical steel sheets constituting a wound core main body will be described. In this specification, the grain-oriented electrical steel sheets have features such as an interlaminar friction coefficient between adjacently grain-oriented electrical steel sheets, the magneto-striction λpp of laminated grain-oriented electrical steel sheets, an arrangement site of grain-oriented electrical steel sheets with a controlled interlaminar friction coefficient in a wound core, and a use rate of grain-oriented electrical steel sheets in a wound core of grain-oriented electrical steel sheet with a controlled interlaminar friction coefficient.

(1) Interlaminar Friction Coefficient of Grain-Oriented Electrical Steel Sheets Adjacently Laminated In a grain-oriented electrical steel sheet constituting a wound core according to an embodiment of the present invention, the interlaminar friction coefficient of laminated steel sheets in at least some of the planar portions is 0.20 or more. If the interlaminar friction coefficient of the planar portions is less than 0.20, the effect of reducing noise of the iron core having a shape of the iron core in the present embodiment is not expressed.

Although the mechanism by which such a phenomenon occurs is not clear, the necessity of this definition is thought as follows.

The target iron core of this specification has a structure in which bent portions limited to very narrow regions and planar portions which are extremely wide regions compared to the bent portions are alternately arranged. It is generally known that, when an iron core forming a closed magnetic circuit is excited, the magnetic flux in the iron core is unevenly distributed on the inner circumferential side of the closed magnetic circuit so that the magnetic circuit becomes short. It is thought that, when the target wound core of the present invention having such a structure is excited, uneven distribution of the magnetic flux in the iron core also changes. For this reason, in the planar portions, a large difference occurs between the magnetic flux density on the inner circumferential side and the magnetic flux density on the outer circumferential side, and the magneto-striction magnitude also differs on the inner circumferential side and the outer circumferential side. That is, in the steel sheets laminated from the inner circumferential side to the outer circumferential side, adjacent steel sheets facing each other are physically deviated to generate friction. It is thought that such friction does not have a particularly conspicuous effect in a conventional wound core in which the area of planar portions is relatively small and adjacent steel sheets are constrained in shape by a gentle curvature over the entire circumference.

On the other hand, in a target iron core of this specification which has a relatively wide area of planar portions, the constraint in shape hardly acts on the planar portions. Therefore, it is thought that effects caused by friction between the adjacent steel sheets (adjacent grain-oriented electrical steel sheets in the laminating direction) due to the difference in magneto-striction (difference in magnetic flux density) appear largely. One of the effects is noise, and in the wound core of the present embodiment, friction greatly contributes to noise. In this specification, noise is reduced by increasing the interlaminar friction coefficient, but it is not thought that this action simply minimizes a dimensional change caused by the difference in magneto-striction of steel sheets (grain-oriented electrical steel sheets) by friction. This is because a very large frictional resistance is required to minimize the dimensional change caused by the difference in magneto-striction, and forcibly minimizing the dimensional change also hinders the change in the magnetic domain structure, which may reduce the magnetic efficiency of an iron core. Actually, in this specification, even if the interlayer friction coefficient is increased within an appropriate range that does not excessively minimize the dimensional change, the magnetic efficiency of the iron core does not decrease and even tends to increase. Considering these factors, the effect of the present invention is thought to be that the kinetic energy of the grain-oriented electrical steel sheets due to magneto-striction is consumed as heat energy due to friction by increasing the interlaminar friction coefficient, thereby reducing vibration energy, that is, noise. It can be interpreted that the tendency for the efficiency of the iron core to improve also has the effect of reducing loss due to eddy iron loss by increasing the temperature of the steel sheets due to the consumed heat energy and increasing electrical resistance. In this manner, the action mechanism in this specification may be quite different from the conventional one.

It should be noted that since this specification defines the iron core, the interlaminar friction coefficient of the grain-oriented electrical steel sheets is not measured with a raw material for forming the iron core, but is measured with grain-oriented electrical steel sheets obtained by disassembling the iron core. For the interlaminar friction coefficient of the grain-oriented electrical steel sheets in this specification, 10 sets of 3 sheets in the order of lamination arbitrarily from the laminated steel sheets (all steel sheets if the number of laminated steel sheets is less than 30 sheets) are taken out, and the interlaminar friction coefficient is determined from the interlaminar friction coefficient measured at the planar portions of each steel sheet. By randomly extracting the samples, it is preferable to measure a representative state which is preferable for expressing the effect of the invention.

A central steel sheet is pulled out while applying a load in the laminating direction to contact surfaces of three stacked steel sheets, and the interlayer friction coefficient is obtained from the relationship between the pull-out load and the load in the laminating direction at that time. In this specification, the load in the laminating direction is set to 1.96 N, the pull-out speed is set to 100 mm/min, the change in pull-out force when the relative deviation between the contact surfaces starts (which generally appears as the peak of static friction force) is ignored, and an average value up to the first 60 mm after the start of the relative deviation is taken as a pull-out load. That is, the interlayer friction coefficient in this specification is a dynamic friction coefficient. The interlaminar friction coefficient in this specification is obtained by (interlaminar friction coefficient)=(pull-out load)/1.96/2, where the unit of the pull-out load is [N]. Here, "/2" takes into consideration the dynamic friction force from both surfaces acting on the steel sheet to be pulled out. However, even if the friction coefficient for each surface is different, this is not taken into account, and the interlaminar friction coefficient is evaluated as an average interlaminar friction coefficient from both surfaces acting on the central steel sheet using the above equation.

Needless to say, for the order of lamination in the above measurement, the steel sheets are stacked in the order of pull-out from the iron core, and the pull-out direction is a magnetization direction in the iron core, that is, a direction from one bent portion to the other bent portion across a planar portion, and a rolling direction of a grain-oriented electrical steel sheet which is a material for a usual iron core in which a usual grain-oriented electrical steel sheet is used as a material for an iron core.

The size of each test piece is not particularly limited as long as it can be pulled out under the above conditions. However, since excessively high surface pressure on a contact surface also causes variations in measurement values, the area of the contact surface should be sufficiently large considering the size of steel sheets taken out from an iron core which is an original material and the size of a tester used for the above measurement. A sample applicable to a general case using a tensile test has a width of about 20 to 150 mm and a length of about 50 to 400 mm. In addition, in order to stabilize the load distribution in the laminating direction on the contact surface during measurement, making the size of steel sheets sandwiching the pulled out central sample sufficiently smaller than that of the pulled out central sample and arranging three steel sheets so that the area of the contact surface during the test is constant with the size of the steel sheets sandwiching the pulled out central sample are preferable to stabilize the test values. For example, in a case where the width of three steel sheets is the same and the length of the three steel sheets is 300 mm, if the two steel sheets on the sandwiching side are cut into a length of 100 mm and the central steel sheet is sandwiched between these two steel sheets, a stable pull-out load can be measured over 200 mm when the length of a grip portion for pulling out the central sheet is ignored while the contact area is kept strictly constant at width×100 mm. However, it is thought that, due to the size of an iron core, from which the sample is cut out, restrictions on the device, and the like, it may be difficult to stably pull out the sample up to the first 60 mm after the start of the relative deviation. In this case, it is acceptable to obtain an average value of the pull-out load from measurement data at distances shorter than 60 mm. However, even in this case, the average pull-out distance is preferably 10 mm or longer. The above test conditions employed in this specification conform to JIS K7125: 1999, and if there are conditions and the like necessary for more precise measurement, tests can be executed according to JIS K7125: 1999.

The interlayer friction coefficient (interlayer friction coefficient of laminated grain-oriented electrical steel sheets) is preferably 0.25 or more and more preferably 0.30 or more. The upper limit is set to 0.70 or less because it is necessary to control the range in which deviation of steel sheets occurs. The upper limit thereof is preferably 0.60 or less.

The interlayer friction coefficient according to the embodiment of the present invention is obtained as the average value of 10 sets of measurement values as described above. However, even if the average value is within the above ranges, if the individual measurement values are out of the above ranges, there may be situations where it is impossible to obtain the effect of the invention. For example, there may be a case where 5 sets of measurement values are 0.10, 5 sets of measurement values are 0.90, and an average value of a total of 10 sets is 0.50. In general, if industrially produced steel sheets with the same standard are laminated, the surface condition does not change so much, and the fluctuation (variation) of the interlaminar friction coefficient is within the range of about 0.20 at most, and therefore, it is not necessary to take such a situation into consideration. However, the above situation may occur in a case where a plurality of types of steel sheets with significantly different surface conditions are intentionally laminated. In consideration of this point, in this specification, more than half of the measured interlaminar friction coefficient data is set to be within a numerical range suitable as average values. When obtaining the interlaminar friction coefficient with 10 sets of measurement values, 5 or more sets of measurement values need to be within the range of 0.20 to 0.70.

(2) Arrangement of Lamination Members (Grain-Oriented Electrical Steel Sheets) with Controlled Interlaminar Friction Coefficient As described above, the effect of the present invention is caused by the difference in dimensional change due to magneto-striction of the grain-oriented electrical steel sheets oppositely laminated in the planar portions, the magneto-striction being caused by uneven distribution of magnetic flux in the iron core. In principle, the grain-oriented electrical steel sheets laminated in all planar portions do not need to be in the friction state specified in this specification, and if even a part of the phenomenon assumed in this specification appears, a reduction in noise can be expected. Nonetheless, it is thought that, in a case where the proportion thereof is very small, the amount of noise reduced also becomes small and it will remain to the extent that it is practically meaningless. In this specification, considering such a situation, the interlaminar friction coefficient of adjacently laminated grain-oriented electrical steel sheets is defined as an average value of 10 sets randomly taken out from an iron core as described above. That is, in this specification, it is acceptable to have an area where the interlaminar friction coefficient is extremely low in an iron core and the phenomenon assumed by the present invention hardly appears and an area where the interlaminar friction coefficient is sufficiently high and the phenomenon assumed by the present invention appears significantly.

In a case where such an uneven distribution of interlayer friction coefficients is intentionally set, it is also possible to assume a preferable form regarding in which region of the planar portions the opposition structure of grain-oriented electrical steel sheets with a relatively high interlayer friction coefficient is placed. For example, as described above, the change rate of magnetic flux density due to uneven distribution of magnetic flux, which is also the cause of the effect of the present invention, increases toward an inner surface portion of an iron core. That is, arranging facing surfaces of grain-oriented electrical steel sheets with a relatively high interlaminar friction coefficient on an inner circumferential portion of an iron core is more effective in reducing noise than arranging them on the outer surface portion, and the effect of the invention can be efficiently obtained.

In addition, in the present embodiment, it is preferable that, in the planar portions, the proportion of the area where steel sheets face each other with an interlayer friction coefficient of 0.20 to 0.70 is 50% or higher of the total area where the steel sheets are laminated and face each other. If this proportion is 50% or higher, a sufficient noise reduction effect can be obtained for any shape of a wound core. The proportion is preferably 70% or higher, and needless to say, the highest condition is that the interlaminar friction coefficients of all facing surfaces of the planar portions satisfy the definition of the present invention.

Furthermore, a preferred form is defined for in which region of the planar portions the opposition structure satisfying the friction conditions defined in this specification is placed. As described above, the change rate of magnetic flux density due to uneven distribution of magnetic flux, which is also the cause of the effect of the present invention, increases toward an inner surface portion of an iron core. That is, the facing surfaces that satisfy the friction conditions are more effective in noise reduction when they are arranged on the inner circumferential portion of the iron core than on the outer surface portion. In the present embodiment, this arrangement is defined such that, in the planar portions, the interlaminar friction coefficient of laminated steel sheets is 0.20 to 0.70 in a region within 50% of the thickness of the laminated steel sheets from an inner side of the wound core. It is possible to efficiently enjoy the effect of the invention by arranging them mainly on the inner side. The proportion is preferably 70% or higher, and needless to say, the highest condition is that the interlaminar friction coefficients of all facing surfaces of the thickness of the laminated steel sheets of the planar portions satisfy the definition of the present embodiment.

(3) Grain-Oriented Electrical Steel Sheets

Regarding the grain-oriented electrical steel sheets used in this specification, although the standard deviations of the interlaminar friction coefficient and magneto-striction $\lambda pp$ are limited to specific ranges, a base steel sheet, a basic coating structure, and the like may be those of well-known grain-oriented electrical steel sheets. As described above, the base steel sheet is a steel sheet in which crystal grain orientations in the base steel sheet are highly concentrated in the {110}<001> orientation, and has excellent magnetic properties in the rolling direction.

A well-known grain-oriented electrical steel sheet can be used as the base steel sheet in this specification. Hereinafter, one example of a preferred base steel sheet will be described.

(3-1) Chemical Composition of Base Steel Sheet

A base steel sheet has a chemical composition containing, in mass %, Si: 2.0% to 7.0%, with the remainder being Fe. This chemical composition allows the crystal orientation to be controlled to the Goss texture concentrated in the {110}<001> orientation and favorable magnetic properties to be secured. Other elements are not particularly limited, and it is allowed to contain known elements within a well-known range instead of Fe. Ranges of the representative contents of representative elements are shown below.

C: 0% to 0.070%,
Mn: 0% to 1.0%,
S: 0% to 0.0250%,
Se: 0% to 0.0150%,
Al: 0% to 0.0650%,
N: 0% to 0.0080%,
Cu: 0% to 0.40%,
Bi: 0% to 0.010%,
B: 0% to 0.080%,
P: 0% to 0.50%,
Ti: 0% to 0.0150%,
Sn: 0% to 0.10%,
Sb: 0% to 0.10%,
Cr: 0% to 0.30%,

Ni: 0% to 1.0%,

Nb: 0% to 0.030%,

V: 0% to 0.030%,

Mo: 0% to 0.030%,

Ta: 0% to 0.030%,

W: 0% to 0.030%,

Since these selective elements may be contained depending on the purpose, it is unnecessary to limit the lower limit value, and it is unnecessary to substantially contain them. In addition, even if these selective elements are contained as impurities, the effect of the present invention is not impaired. Impurities refer to elements that are unintentionally contained, and mean elements that are mixed from ore and scraps as raw materials, a production environment, and the like when the base steel sheet is industrially produced.

The chemical component of the base steel sheet may be measured by a general analysis method for steel. For example, the chemical component of the base steel sheet may be measured using Inductively Coupled Plasma-Atomic Emission Spectrometry (ICP-AES). Specifically, the chemical composition thereof can be specified by, for example, acquiring a 35 mm square test piece from the central position of the base steel sheet and performing measurement with ICPS-8100 (measurement device) available from Shimadzu Corporation or the like under the conditions based on a calibration curve created in advance. C and S may be measured through a combustion-infrared absorption method, and N may be measured through an inert gas fusion-thermal conductivity method.

The above chemical composition is a component of the base steel sheet. In a case where a grain-oriented electrical steel sheet as a measurement sample has, for example, an insulating coating and a primary coating (such as glass coating or an intermediate layer) made of an oxide or the like on the surface, these coatings are removed through a well-known method and the chemical composition is then measured.

(3-2) Magneto-Striction of Grain-Oriented Electrical Steel Sheets

The grain-oriented electrical steel sheets applied to the iron core according to the embodiment of the present invention have a feature such as the inter-layer friction coefficient (the inter-layer friction coefficient of the laminated grain-oriented electrical steel sheets) as described above. Another important characteristic regarding expression of the effect of the invention will be described. As described above, the effect of the present invention is caused by the difference in the magneto-striction magnitude between adjacently laminated grain-oriented electrical steel sheets. In the above explanation, it is described that one of the causes of the difference in the magneto-striction magnitude is non-uniform magnetic flux density, but the variation in magnetostrictive properties of produced steel sheets is also the cause thereof, and this can also be used. In this specification, this is defined by the standard deviation of magneto-striction λpp of the laminated grain-oriented electrical steel sheets, and the standard deviation of the magneto-striction is $0.01\times10^{-6}$ to $0.10\times10^{-6}$.

In a case where the standard deviation of the magneto-striction λpp is zero, deviation of adjacently laminated steel sheets is caused by only the non-uniform magnetic flux density. However, if the standard deviation is a significant value, in addition to the non-uniform magnetic flux density, the difference in the magneto-striction magnitude itself causes deviation of the adjacently laminated steel sheets, which acts to reduce noise. The lower limit that causes a significant difference is preferably $0.01\times10^{-6}$ or more. The lower limit thereof is more preferably $0.03\times10^{-6}$ or more.

On the other hand, in a case where it is attempted to increase the standard deviation of the magneto-striction λpp, because the lower limit of the magneto-striction λpp is zero, there is no choice but to increase the magneto-striction λpp of steel sheets with a larger magneto-striction λpp. An increase in the magneto-striction λpp of the steel sheets laminated in this manner leads to an increase in noise. To avoid this, it is preferable to set the upper limit to $0.10\times10^{-6}$ or less. The upper limit thereof is more preferably $0.08\times10^{-6}$ or less.

It should be noted that if steel sheets having different magnetostrictive properties are arranged according to the non-uniform the magnetic flux density, the effect of the invention is unlikely to appear. For example, if a steel sheet with a small magneto-striction λpp is placed on the inner side where the magnetic flux density is high, and a steel sheet with a high magneto-striction λpp is placed on the outer side where the magnetic flux density is low, regardless of the fact that the standard deviation of the magneto-striction λpp is within the scope of the invention, the effect of the invention may be reduced compared to the case where the standard deviation of the magneto-striction λpp is zero. However, arranging steel sheets having variations in magneto-striction λpp according to variations in magnetic flux density in this manner requires a great deal of time and effort, which is not realistic. The standard deviation of the magneto-striction λpp in this specification is determined from characteristic values of the magneto-striction λpp measured at planar portions of each steel sheet obtained by arbitrarily taking out a plurality of stacked steel sheets. Regarding the plurality of sheets, 20 sheets (all steel sheets in a case where the number of laminated steel sheets is less than 20) are taken out, for example. By randomly extracting samples in this manner, the arbitrary arrangement as described above can be excluded, and representative conditions preferable for expressing the effect of the invention can be defined.

(4) Method of Producing Grain-Oriented Electrical Steel Sheet

The method of producing a grain-oriented electrical steel sheet is not particularly limited, and a conventionally known method of producing a grain-oriented electrical steel sheet can be appropriately selected. Preferred specific examples of the production method include a method in which a slab containing 0 to 0.070 mass % of C and having the chemical composition of the above grain-oriented electrical steel sheet for the rest is heated to 1,000° C. or higher to perform hot rolling, and then hot-band annealing is performed as necessary, a cold-rolled steel sheet is subsequently obtained through cold rolling once or cold rolling twice or more including intermediate annealing, heated at 700° C. to 900° C. in, for example, a wet hydrogen-inert gas atmosphere, subjected to decarburization annealing, further subjected to nitridation annealing as necessary, and subjected to finish annealing at about 1,000° C. after an annealing separator is applied to the nitridation-annealed cold-rolled steel sheet to form an insulating coating at about 900° C. Furthermore, after that, coating or the like for adjusting the interlayer friction coefficient may be performed.

In addition, the effect of the present invention can be obtained even with a steel sheet subjected to processing generally called "magnetic domain control" by a well-known method in the step of producing a steel sheet.

The interlaminar friction coefficient, which is a feature of the grain-oriented electrical steel sheet used in this specification, is adjusted by the type of coating and surface conditions such as surface roughness. The method is not particularly limited, and a well-known method may be used as appropriate. For example, the roughness of a base steel sheet can be controlled by appropriately controlling the roll roughness of a hot-rolled steel sheet and a cold-rolled steel sheet and grinding the surface of the base steel sheet, and through chemical etching such as pickling. In addition, other examples thereof include a method of raising the baking temperature of a coating or extending the baking time to promote the surface smoothness of the glassy coating, reducing the roughness, and increasing the contact area between steel sheets to increase the static friction coefficient. As a result, the interlaminar friction coefficient increases and the slippage can be reduced.

In reality, it may be necessary to finally control the interlaminar friction coefficient to the desired level while observing the surface condition of the steel sheets actually produced as trials, it would not be difficult for those skilled in the art to adjust the surface condition of products while carrying out rolling or a surface treatment on a daily basis.

In addition, the timing of performing the treatment for controlling the interlayer friction coefficient is not particularly limited. It is thought that the above rolling, chemical etching, and coating baking may be carried out as appropriate in general production processes for grain-oriented electrical steel sheets. The method is not limited thereto, and a method of, for example, applying some sort of lubricating substance through spraying or with a roll coater or the like at a timing immediately before or immediately after bending in the work of slitting a steel sheet and producing bent steel sheet members to be laminated as an iron core is conceivable. In addition, it is also possible to arrange a rolling roll immediately before bending and change the surface roughness through light rolling to control the interlaminar friction coefficient.

3. Method of Producing Wound Core

The method of producing a wound core according to an embodiment of the present invention is not particularly limited as long as it can produce a wound core according to the present invention, and methods according to well-known wound cores introduced as Patent Documents 8 to 10 in Background Art may be applied, for example. In particular, it can be said that a method of using a production device UNICORE (registered trademark: https://www.aemcores-.com.au/technology/unicore/) of AEM UCORE is optimal.

Furthermore, a heat treatment may be performed as necessary according to the well-known method. In addition a wound core main body obtained may be used as a wound core as it is or may be used as a wound core obtained by integrally fixing a plurality of grain-oriented electrical steel sheets stacked using a well-known fastener such as a binding band, as necessary.

The embodiments of the present invention are not limited to the above. The above embodiments are examples, and any form which has substantially the same configuration as the technical idea described in the claims of this specification and exhibits the same operational effects is included in the technical scope of this specification.

EXAMPLES

Hereinafter, the technical details of this specification will be further described with reference to examples of the present invention. The conditions in the examples shown below are condition examples employed for confirming the feasibility and effect of this specification, and this specification is not limited to these condition examples. In addition, this specification may use various conditions as long as the gist of this specification is not deviated and the object of this specification is achieved.

(Grain-Oriented Electrical Steel Sheets)

A slab having a chemical composition shown in Table 1 (mass %, the remainder other than the displayed elements is Fe) was used as a material to produce a final product having a chemical composition shown in Table 2 (mass %, the remainder other than the displayed elements is Fe).

In Tables 1 and 2, "-" indicates an element for which producing and a control were not performed with awareness of the content and of which the content was not measured. In addition, "<0.002" and "<0.004" indicate elements for which producing and a control were performed with awareness of the content and of which the content was measured, but sufficient measurement values (below the detection limit) could not be obtained as credibility of accuracy.

TABLE 1

| Steel | Slab | | | | | | | | |
|---|---|---|---|---|---|---|---|---|---|
| type | C | Si | Mn | S | Al | N | Cu | Bi | Nb |
| A | 0.070 | 3.26 | 0.07 | 0.025 | 0.026 | 0.008 | 0.07 | — | — |
| B | 0.070 | 3.26 | 0.07 | 0.025 | 0.026 | 0.008 | 0.07 | — | 0.007 |
| C | 0.070 | 3.26 | 0.07 | 0.025 | 0.025 | 0.008 | 0.07 | 0.002 | — |
| D | 0.060 | 3.45 | 0.10 | 0.006 | 0.027 | 0.008 | 0.20 | — | 0.005 |

TABLE 2

| Steel | Final product | | | | | | | | |
|---|---|---|---|---|---|---|---|---|---|
| type | C | Si | Mn | S | Al | N | Cu | Bi | Nb |
| A | 0.001 | 3.15 | 0.07 | <0.002 | <0.004 | <0.002 | 0.07 | — | — |
| B | 0.001 | 3.15 | 0.07 | <0.002 | <0.004 | <0.002 | 0.07 | — | 0.005 |
| C | 0.001 | 3.15 | 0.07 | <0.002 | <0.004 | <0.002 | 0.07 | 0.002 | — |
| D | 0.001 | 3.34 | 0.10 | <0.002 | <0.004 | <0.002 | 0.20 | — | — |

The production process conforms to the production conditions for general known grain-oriented electrical steel sheets.

Specifically, hot rolling, hot-band annealing, and cold rolling were performed. Some of the cold-rolled steel sheets after decarburization annealing were subjected to a nitridation treatment (nitridation annealing) for performing denitrification in a hydrogen-nitrogen-ammonia mixed atmosphere. In addition, for magnetic domain control, periodic linear grooves were formed on surfaces of the steel sheets by laser irradiation.

Furthermore, an annealing separator mainly composed of MgO was applied, and finish annealing was performed. An insulating coating application solution containing chromium and mainly composed of phosphate and colloidal silica was applied onto primary coatings formed on surfaces of steel sheets subjected to finish annealing, and subjected to a heat treatment to form an insulating coating.

As for the interlayer friction coefficient, the degree (roughness) of the surface smoothness of the glassy insulating coating which will be the final outermost surface was controlled through a well-known technique of, for example, changing the particle diameter of an oxide added to the annealing separator or changing the baking temperature and time when forming an insulating coating to adjust the interlaminar friction coefficient.

Furthermore, for some materials, epoxy resins with different viscosities were applied at 2 g/m$^2$ and baked at 200° C. to form surface films with different interlayer friction coefficients.

In addition, the variation of the magneto-striction λpp was controlled by adjusting the sampling position from a grain-oriented electrical steel sheet coil of a cut sheet of a grain-oriented electrical steel sheet used to construct an iron core. There are variations in magneto-striction λpp in industrially produced grain-oriented electrical steel sheet coils due to, for example: variations in crystal orientation, particularly in rotation angle β around the direction orthogonal to rolling of steel sheets which is particularly called a "dividing angle" due to a coil set (curvature in the coils: the curvature increases toward the inner circumferential portion) at points in time of secondary recrystallization; variations in tension in the process of an insulating coating formation heat treatment; or residual strain due to handling of coils. Such variations are small within a close proximity area in a coil but are large when considering the entire length of a coil, such as from the top portion to the bottom portion. In this example, not only an iron core with a small variation in magneto-striction λpp was produced using only cut sheets collected from the close proximity area but also an iron core with a large variation in magneto-striction λpp was produced using a cut sheet collected thoroughly from the top portion to the bottom portion.

Various properties of grain-oriented electrical steel sheets used as materials for iron cores and the grain-oriented electrical steel sheets collected from the iron cores were measured through the following technique. The properties of grain-oriented electrical steel sheets were shown in Table 3 for series in which the interlaminar friction coefficient was controlled and in Table 4 for series in which the variations in magneto-striction λpp were controlled. In Tables 3, 4, 6, and 7, "interlaminar friction coefficient" is abbreviated as "friction coefficient."

TABLE 3

| | | Hot rolling | | | | | | Cold rolling | | Decarburization annealing | |
|---|---|---|---|---|---|---|---|---|---|---|---|
| | | Heating | Finish | Winding | Sheet | Hot-band annealing | | Sheet | Cold | Heating | |
| Steel sheet No. | Steel type | temperature ° C. | temperature ° C. | temperature ° C. | thickness mm | Temperature ° C. | Time Seconds | thickness mm | rolling rate % | temperature ° C. | Time Seconds |
| A1 | A | 1150 | 900 | 540 | 2.9 | 1100 | 180 | 0.35 | 87.9 | 800 | 180 |
| A2 | A | 1150 | 900 | 540 | 2.9 | 1100 | 180 | 0.35 | 87.9 | 800 | 180 |
| A3 | A | 1150 | 900 | 540 | 2.9 | 1100 | 180 | 0.35 | 87.9 | 800 | 180 |
| A4 | A | 1150 | 900 | 540 | 2.9 | 1100 | 180 | 0.35 | 87.9 | 800 | 180 |
| B1 | B | 1150 | 880 | 650 | 2.5 | 1150 | 180 | 0.23 | 90.8 | 750 | 180 |
| B2 | B | 1150 | 880 | 650 | 2.5 | 1150 | 180 | 0.23 | 90.8 | 750 | 180 |
| B3 | B | 1150 | 880 | 550 | 2.5 | 1150 | 180 | 0.23 | 90.8 | 750 | 180 |
| B4 | B | 1150 | 880 | 650 | 2.5 | 1150 | 180 | 0.23 | 90.8 | 750 | 180 |
| C1 | C | 1150 | 900 | 750 | 2.8 | 1100 | 120 | 0.26 | 90.7 | 850 | 180 |
| C2 | C | 1150 | 900 | 750 | 2.8 | 1100 | 120 | 0.26 | 90.7 | 850 | 180 |
| C3 | C | 1150 | 900 | 750 | 2.8 | 1100 | 120 | 0.26 | 90.7 | 850 | 180 |
| C4 | C | 1150 | 900 | 750 | 2.8 | 1100 | 120 | 0.26 | 90.7 | 850 | 180 |
| D1 | D | 1350 | 930 | 540 | 2.7 | 1050 | 180 | 0.26 | 90.4 | 850 | 180 |
| D2 | D | 1350 | 930 | 540 | 2.7 | 1050 | 180 | 0.26 | 90.4 | 850 | 180 |
| D3 | D | 1350 | 930 | 540 | 2.7 | 1050 | 180 | 0.26 | 90.4 | 850 | 180 |
| D4 | D | 1350 | 930 | 540 | 2.7 | 1050 | 180 | 0.26 | 90.4 | 850 | 180 |

| | | Finish annealing | | | | Properties | | |
|---|---|---|---|---|---|---|---|---|
| Steel sheet No. | Nitridation | Temperature ° C. | Time Hour | Magnetic domain control | Friction coefficient control | B8 T | Magneto-striction λpp ×10$^{-6}$ | Friction coefficient — |
| A1 | Done | 1100 | 50 | None | Controlled | 1.91 | 0.63 | 0.09 |
| A2 | | 1100 | 50 | | by particle | 1.90 | 0.66 | 0.16 |
| A3 | | 1100 | 50 | | diameter of | 1.92 | 0.60 | 0.27 |
| A4 | | 1100 | 50 | | raw | 1.91 | 0.66 | 0.66 |

TABLE 3-continued

| | | | | | | | | |
|---|---|---|---|---|---|---|---|---|
| | | | | | material for annealing separator | | | |
| B1 | Done | 1100 | 50 | Done | Controlled by time and temperature of insulating coating formation heat treatment | 1.93 | 0.33 | 0.05 |
| B2 | | 1100 | 50 | | | 1.94 | 0.28 | 0.12 |
| B3 | | 1100 | 50 | | | 1.92 | 0.32 | 0.20 |
| B4 | | 1100 | 50 | | | 1.95 | 0.31 | 0.35 |
| C1 | Done | 1150 | 60 | None | Controlled by viscosity of epoxy resin-based coating material | 1.92 | 0.51 | 0.02 |
| C2 | | 1150 | 60 | | | 1.93 | 0.56 | 0.18 |
| C3 | | 1150 | 60 | | | 1.93 | 0.55 | 0.31 |
| C4 | | 1150 | 60 | | | 1.94 | 0.48 | 0.64 |
| D1 | None | 1100 | 70 | None | Controlled by time and temperature of insulating coating formation heat treatment | 1.93 | 0.54 | 0.12 |
| D2 | | 1100 | 70 | | | 1.92 | 0.48 | 0.18 |
| D3 | | 1100 | 70 | | | 1.91 | 0.56 | 0.26 |
| D4 | | | 70 | | | 1.94 | 0.51 | 0.33 |

TABLE 4

| | | Hot rolling | | | | Hot-band annealing | | Cold rolling | | Decarburization annealing | |
|---|---|---|---|---|---|---|---|---|---|---|---|
| Steel sheet No. | Steel type | Heating temperature ° C. | Finish temperature ° C. | Winding temperature ° C. | Sheet thickness mm | Temperature ° C. | Time Seconds | Sheet thickness mm | Cold rolling rate % | Heating temperature ° C. | Time Seconds |
| A11 | A | 1150 | 900 | 540 | 2.9 | 1100 | 180 | 0.35 | 87.9 | 800 | 180 |
| A12 | A | 1150 | 900 | 540 | 2.9 | 1100 | 180 | 0:35 | 87.9 | 800 | 180 |
| A13 | A | 1150 | 900 | 540 | 2.9 | 1100 | 180 | 0.35 | 87.9 | 800 | 180 |
| A14 | A | 1150 | 900 | 540 | 2.9 | 1100 | 180 | 0.35 | 87.9 | 800 | 180 |
| B11 | B | 1150 | 880 | 650 | 2.5 | 1150 | 180 | 0.23 | 90.8 | 750 | 180 |
| B12 | B | 1150 | 880 | 650 | 2.5 | 1150 | 180 | 0.23 | 90.8 | 750 | 180 |
| B13 | B | 1150 | 880 | 650 | 2.5 | 1150 | 180 | 0.23 | 90.8 | 750 | 180 |
| B14 | B | 1150 | 880 | 650 | 2.5 | 1150 | 180 | 0.23 | 90.8 | 750 | 180 |
| D11 | D | 1350 | 930 | 540 | 2.7 | 1050 | 180 | 0.26 | 90.4 | 850 | 180 |
| D12 | D | 1350 | 930 | 540 | 2.7 | 1050 | 180 | 0.26 | 90.4 | 850 | 180 |
| D13 | D | 1350 | 930 | 540 | 2.7 | 1050 | 180 | 0.26 | 90.4 | 850 | 180 |
| D14 | D | 1350 | 930 | 540 | 2.7 | 1050 | 180 | 0.26 | 90.4 | 850 | 180 |

| | | Finish annealing | | | Properties | | | |
|---|---|---|---|---|---|---|---|---|
| Steel sheet No. | Nitridation | Temperature ° C. | Time Hour | Magnetic domain control | B8 T | Magnetostriction λpp $\times 10^{-6}$ | Standard deviation of magnetostriction $\times 10^{-6}$ | Friction coefficient — |
| A11 | Done | 1100 | 50 | None | 1.92 | 0.63 | 0.06 | 0.22 |
| A12 | | 1100 | 50 | | 1.90 | 0.60 | 0.08 | 0.22 |
| A13 | | 1100 | 50 | | 1.91 | 0.63 | 0.12 | 0.22 |
| A14 | | 1100 | 50 | | 1.90 | 0.59 | 0.19 | 0.22 |
| B11 | Done | 1100 | 50 | Done | 1.93 | 0.31 | 0.05 | 0.32 |
| B12 | | 1100 | 50 | | 1.94 | 0.32 | 0.09 | 0.32 |
| B13 | | 1100 | 50 | | 1.95 | 0.28 | 0.14 | 0.32 |
| B14 | | 1100 | 50 | | 1.93 | 0.31 | 0.16 | 0.32 |
| D11 | None | 1100 | 70 | None | 1.93 | 0.53 | 0.02 | 0.26 |
| D12 | | 1100 | 70 | | 1.91 | 0.51 | 0.06 | 0.26 |
| D13 | | 1100 | 70 | | 1.93 | 0.51 | 0.11 | 0.26 |
| D14 | | 1100 | 70 | | 1.94 | 0.51 | 0.14 | 0.26 |

(Iron Core)

Figure 7:
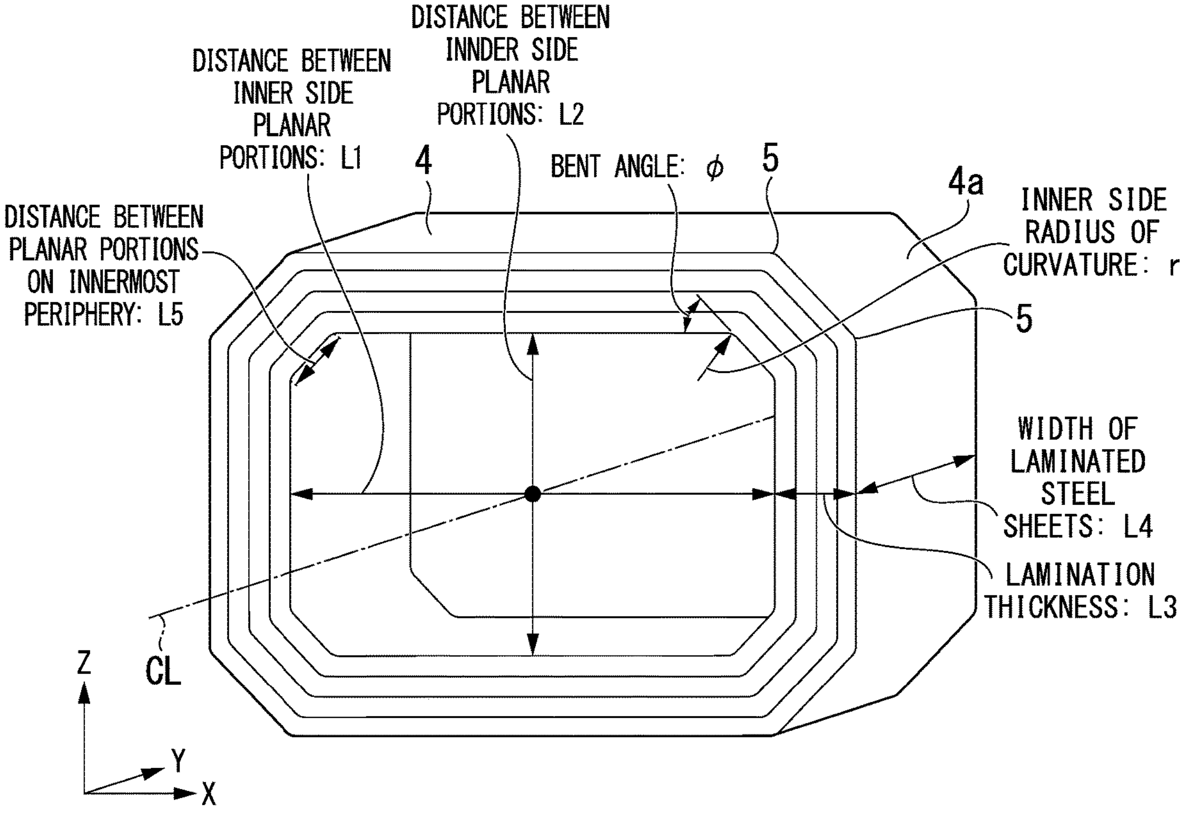
FIG. 7 is a schematic diagram showing dimensions of wound cores produced in examples and comparative examples.

Wound cores a to e having shapes shown in Table 5 and FIG. 7 were produced using each steel sheet as a material.

L1 is parallel to the X-axis direction and is a distance between parallel grain-oriented electrical steel sheets 1 on the innermost periphery of a wound core in a flat cross section including the center CL (distance between inner side planar portions). The planar portions refer to linear portions other than bent portions. L2 is parallel to the Z-axis direction and is a distance between parallel grain-oriented electrical steel sheets 1 on the innermost periphery of a wound core in a vertical cross section including the center CL (distance between inner side planar portions). L3 is parallel to the X-axis direction and is a lamination thickness (thickness in the laminating direction) of a wound core in a flat cross section including the center CL. L4 is parallel to the X-axis direction and is a width of laminated steel sheets of a wound core in a flat cross section including the center CL. L5 is a distance between planar portions (distance between bent portions) which are adjacent to each other in the innermost portion of a wound core and arranged to form a right angle together. In other words, L5 is the shortest length of the planar portions 4*a* in the longitudinal direction between the planar portions 4, 4*a* of a grain-oriented electrical steel sheet on the innermost periphery. r is a radius of curvature of a bent portion on the inner side of a wound core, and o is a bent angle of the bent portion of the wound core. The substantially rectangular iron cores a to e in which the planar portions having a distance L1 between inner side planar portions are divided at approximately the center of the distance L1 have a structure in which two iron cores having a "substantially U-shape" are joined. Here, the iron core with the core No. e is an iron core which is conventionally used as a general wound core and produced through a method in which steel sheets are sheared and then wound into a cylindrical shape, corner portions of the cylindrical laminated body are subsequently pressed so as to have a constant curvature, and the cylindrical laminated body is formed into a substantially rectangular shape and is then annealed to maintain the shape. For this reason, the radius of curvature of the bent portion varies greatly depending on the lamination position of the steel sheets. r in Table 5 is r on the innermost surface. r increases toward the outside and is approximately 70 mm at the outermost circumferential portion.

TABLE 5

| | Core shape | | | | | | |
|---|---|---|---|---|---|---|---|
| Core No. | L1 mm | L2 mm | L3 mm | L4 mm | L5 mm | r mm | φ ° |
| a | 197 | 66 | 45 | 150 | 16 | 1 | 45 |
| b | 197 | 66 | 45 | 150 | 18 | 2 | 45 |
| c | 197 | 66 | 45 | 150 | 20 | 3 | 45 |
| d | 197 | 66 | 55 | 150 | 20 | 2 | 30 |
| e | 197 | 66 | 45 | 150 | — | 15 | 90 |

(Evaluation Method)

(1) Magnetic Properties of Grain-Oriented Electrical Steel Sheet

The magnetic properties of a grain-oriented electrical steel sheet were measured based on a single sheet magnetic property test method (Single Sheet Tester: SST) specified in JIS C 2556:2015. Each property was measured at a total of 20 points including 5 positions on the longitudinal side (1/10, 3/10, 5/10, 7/10, and 9/10 of the total length) of a strip-like electrical steel sheet unwound from a coil produced and 4 positions on the width side (1/5, 2/5, 3/5, and 4/5 of the width) at each of the positions on the longitudinal side, and an average value thereof was taken as a property of the steel sheet. In addition, the standard deviation of the magnetostriction λpp was obtained from the measured values at 20 points.

The electrical steel sheet to be measured have a width equal to or wider than the width of the single sheet (electrical steel sheet) used in the single sheet magnetic property test method (SST).

(2) Interlaminar Friction Coefficient of Grain-Oriented Electrical Steel Sheets (Materials)

The interlaminar friction coefficient of grain-oriented electrical steel sheets was obtained basically in the same manner as the interlaminar friction coefficient of the grain-oriented electrical steel sheets laminated in the iron core as described above. However, collection of samples was carried out as follows. First, 20 steel sheets with a width direction length of 50 mm and a rolling direction length of 350 mm were cut out at the above 20 positions (20 points), 18 sheets were arbitrarily selected from them, and these were further divided into 6 sets of 3 sheets. For each set, one sheet was regarded as a pull-out sample and the other two sheets were regarded as sandwiching samples by adjusting the size of the sheets in the rolling direction to 100 mm. 50 mm of an end portion of the pull-out sample in the rolling direction was regarded as a grip portion, a portion adjacent to the grip portion was sandwiched between the sandwiching samples, and a load of 1.96 N was uniformly applied to the sandwiching samples. By pulling out the pull-out sample in this state, the change in pull-out load over about 200 mm was changed. Then, the change in pull-out force when relative deviation between the contact surfaces starts was ignored, and an average value of the pull-out loads in at a pull-out distance of 60 mm from 30 to 90 mm after starting the relative deviation was used as a pull-out load in a test of one set to obtain an interlaminar friction coefficient for each set. Furthermore, an average value of interlaminar friction coefficients for the 6 sets was regarded as an interlaminar friction coefficient of the grain-oriented electrical steel sheets.

As magnetic properties, the magnetic flux density B8 (T) in the rolling direction of a steel sheet when excitation was performed at 800 A/m and the peak-to-peak value of magneto-striction at an AC frequency of 50 Hz and an excitation magnetic flux density of 1.7 T were measured.

(3) Noise Characteristics of Iron Core

The noise of each iron core was measured based on the method of IEC60076-10, which specifies the number of microphones, the arrangement of the microphones, the distance between the microphones and the iron core, and the like at the time of noise measurement.

(4) Interlaminar Friction Coefficient of Grain-Oriented Electrical Steel Sheets Laminated in Iron Core The interlaminar friction coefficient of grain-oriented electrical steel sheets laminated in an iron core was obtained as follows. An iron core was disassembled, 10 sets of 3 sheets in the order of lamination arbitrarily from the laminated steel sheets were selected, and a total of 60 steel sheets having a rolling direction length of 90 mm and a width of 80 mm from the center portion in the width direction were cut out from the planar portions of which the above distance between inner side planar portions was L1. Furthermore, for each set, one sheet in the center of the lamination was regarded as a pull-out sample and the other two sheets were regarded as sandwiching samples by adjusting the length of the sheets in the rolling direction to 10 mm. 20 mm of an end portion of the pull-out sample in the rolling direction was regarded as a grip portion, a portion adjacent to the grip portion was sandwiched between the sandwiching samples, and a load of 1.96 N was uniformly applied to the sandwiching samples. By pulling out the pull-out sample in this state, the change in pull-out load over about 60 mm was changed. Then, the change in pull-out force when relative deviation between the contact surfaces starts was ignored, and an average value of the pull-out loads in at a pull-out distance of 40 mm from 10 to 50 mm after starting the relative deviation was used as a pull-out load in a test of one set to obtain an interlaminar friction coefficient for each set. Furthermore, an average value of interlaminar friction coefficients for the 10 sets was regarded as an interlaminar friction coefficient of the grain-oriented electrical steel sheets laminated in the iron core. In addition, the number of measurement values within a range of 0.20 to 0.70 out of 10 measurement values for each iron core is obtained.

(5) Magneto-Striction λpp of Grain-Oriented Electrical Steel Sheets Laminated in Iron Core and Standard Deviation Thereof The standard deviation of magneto-striction λpp of grain-oriented electrical steel sheets laminated in an iron core was obtained as follows. The iron core was disassembled, 20 steel sheets were arbitrarily selected from the laminated steel sheets, and planar portions thereof were cut out and used as samples. With these samples, the peak-to-peak value of magneto-striction at an AC frequency of 50 Hz and an excitation magnetic flux density of 1.7 T were measured. An average value of the 20 sheets was regarded as magneto-striction λpp of the grain-oriented electrical steel sheets laminated in the iron core, and the standard deviation thereof was obtained.

Example 1

Noise was evaluated in various iron cores produced using various steel sheets having different interlaminar friction coefficients. In addition, each iron core was disassembled, and the interlaminar friction coefficient of grain-oriented electrical steel sheets laminated was obtained. The results are shown in Table 6. It can be seen that, even in a case where materials of the same steel type and having substantially the same magneto-striction λpp are used, the noise of iron cores can be reduced by appropriately controlling the interlaminar friction coefficient.

In addition, Table 6 shows examples (Test Nos. 1-25 to 1-28) in which steel sheets, which have significantly different interlaminar friction coefficients and showed a large difference in noise in a case where the iron core shape is within the scope of the invention, are used as materials to produce an iron core (core No. e) having a larger radius of curvature of a bent portion. The iron core with the core No. e is an iron core which is used as conventionally used as a general wound core and produced through a method in which steel sheets are wound into a cylindrical shape, corner portions of the cylindrical laminated body are subsequently pressed so as to have a constant curvature, and the cylindrical laminated body is formed into a substantially rectangular shape and is then annealed to remove strain and maintain the shape. In these cases, strain relief annealing is performed at 700° C. for 2 hours. In the table, the property values of steel sheets obtained by disassembling an iron core are indicated by "-," which means that the shapes of the steel sheets obtained by disassembling the iron core of the core No. e through a heat treatment and application of strain in the production process above, and therefore, appropriate property values could not be obtained. In these cases, although the noise itself is reduced by the final strain relief annealing, it can be seen that the effect of the present invention cannot be expected even if at least the interlaminar friction coefficient of the raw material steel sheet is significantly changed.

TABLE 6

| | | | Iron core properties | | | | |
|---|---|---|---|---|---|---|---|
| Test No. | Steel sheet No. | Core No. | Magneto-striction $\times 10^{-6}$ | Friction coefficient | Number of sets between 0.20 to 0.70 Out of 10 sets | Noise dB | Remarks |
| 1-1 | A1 | a | 0.66 | 0.13 | 0 | 32.6 | Comparative example |
| 1-2 | A2 | a | 0.66 | 0.18 | 3 | 33.2 | Comparative example |
| 1-3 | A3 | a | 0.65 | 0.30 | 10 | 27.6 | Invention example |
| 1-4 | A4 | a | 0.67 | 0.67 | 7 | 25.3 | Invention example |
| 1-5 | B1 | a | 0.33 | 0.08 | 0 | 33.1 | Comparative example |
| 1-6 | B2 | a | 0.36 | 0.15 | 0 | 31.6 | Comparative example |
| 1-7 | B3 | a | 0.35 | 0.24 | 9 | 26.1 | Invention example |
| 1-8 | B4 | a | 0.35 | 0.37 | 10 | 26.3 | Invention example |
| 1-9 | C1 | a | 0.55 | 0.02 | 0 | 32.6 | Comparative example |
| 1-10 | C2 | a | 0.56 | 0.21 | 7 | 26.8 | Invention example |
| 1-11 | C3 | a | 0.60 | 0.33 | 10 | 27.1 | Invention example |
| 1-12 | C4 | a | 0.52 | 0.68 | 6 | 24.6 | Invention example |

TABLE 6-continued

| Test No. | Steel sheet No. | Core No. | Iron core properties Magneto-striction ×$10^{-6}$ | Friction coefficient | Number of sets between 0.20 to 0.70 Out of 10 sets | Noise dB | Remarks |
|---|---|---|---|---|---|---|---|
| 1-13 | D1 | a | 0.57 | 0.12 | 2 | 33.3 | Comparative example |
| 1-14 | D2 | a | 0.54 | 0.22 | 8 | 27.3 | Invention example |
| 1-15 | D3 | a | 0.56 | 0.27 | 10 | 26.9 | Invention example |
| 1-16 | D4 | a | 0.55 | 0.36 | 10 | 27.6 | Invention example |
| 1-17 | A1 | b | 0.66 | 0.09 | 1 | 32.5 | Comparative example |
| 1-18 | A3 | b | 0.66 | 0.27 | 9 | 27.6 | Invention example |
| 1-19 | B1 | b | 0.34 | 0.05 | 0 | 33.1 | Comparative example |
| 1-20 | B3 | b | 0.34 | 0.20 | 5 | 28.5 | Invention example |
| 1-21 | C1 | c | 0.57 | 0.02 | 0 | 33.3 | Comparative example |
| 1-22 | C3 | c | 0.58 | 0.58 | 10 | 24.6 | Invention example |
| 1-23 | D1 | d | 0.55 | 0.08 | 1 | 31.6 | Comparative example |
| 1-24 | D3 | d | 0.59 | 0.29 | 10 | 25.3 | Invention example |
| 1-25 | A1 | e | — | — | — | 31.2 | Comparative example |
| 1-26 | A3 | e | — | — | — | 31.9 | Comparative example |
| 1-27 | B1 | e | — | — | — | 29.8 | Comparative example |
| 1-28 | B3 | e | — | — | — | 29.4 | Comparative example |

Example 2

Noise was evaluated in various iron cores produced using various steel sheets having different interlaminar friction coefficients, magneto-striction 2pp, and standard deviations of magneto-striction λpp. In addition, each iron core was disassembled, and the interlaminar friction coefficient, the magneto-striction λpp, and the standard deviation of the magneto-striction λpp of grain-oriented electrical steel sheets laminated were obtained. The results are shown in Table 7. It can be seen that the noise of iron cores can be reduced by optimizing the standard deviation of the magneto-striction λpp in addition to the interlaminar friction coefficient.

TABLE 7

| Test No. | Steel sheet No. | Core No. | Iron core properties Magneto-striction ×$10^{-6}$ | Standard deviation of magneto-striction | Friction coefficient | Number of sets between 0.20 to 0.70 Out of 10 sets | Noise dB | Remarks |
|---|---|---|---|---|---|---|---|---|
| 2-1 | A11 | c | 0.65 | 0.07 | 0.22 | 8 | 23.9 | Invention example |
| 2-2 | A12 | c | 0.65 | 0.08 | 0.24 | 9 | 23.1 | Invention example |
| 2-3 | A13 | c | 0.65 | 0.13 | 0.23 | 8 | 26.4 | Invention example |
| 2-4 | A14 | c | 0.63 | 0.19 | 0.22 | 9 | 26.8 | Invention example |
| 2-5 | B11 | c | 0.33 | 0.05 | 0.33 | 10 | 23.7 | Invention example |
| 2-6 | B12 | c | 0.37 | 0.09 | 0.33 | 10 | 23.6 | Invention example |
| 2-7 | B13 | c | 0.28 | 0.14 | 0.34 | 10 | 26.0 | Invention example |
| 2-8 | B14 | c | 0.36 | 0.17 | 0.34 | 10 | 26.1 | Invention example |
| 2-9 | D11 | c | 0.56 | 0.03 | 0.26 | 10 | 23.1 | Invention example |

TABLE 7-continued

| | | | Iron core properties | | | | | |
|---|---|---|---|---|---|---|---|---|
| Test No. | Steel sheet No. | Core No. | Magneto-striction $\times 10^{-6}$ | Standard deviation of magneto-striction | Friction coefficient | Number of sets between 0.20 to 0.70 Out of 10 sets | Noise dB | Remarks |
| 2-10 | D12 | c | 0.60 | 0.06 | 0.28 | 10 | 23.5 | Invention example |
| 2-11 | D13 | c | 0.60 | 0.12 | 0.26 | 10 | 26.2 | Invention example |
| 2-12 | D14 | c | 0.61 | 0.15 | 0.27 | 10 | 26.7 | Invention example |
| 2-13 | B11 | a | 0.34 | 0.05 | 0.34 | 10 | 23.4 | Invention example |
| 2-14 | B13 | a | 0.31 | 0.15 | 0.33 | 10 | 26.7 | Invention example |
| 2-15 | D11 | d | 0.65 | 0.04 | 0.27 | 10 | 22.2 | Invention example |
| 2-16 | D13 | d | 0.68 | 0.13 | 0.28 | 10 | 24.6 | Invention example |

From the above results, it became clear that, in the wound core of the present invention, more than half of measurement values obtained at a plurality of different lamination thickness positions are 0.20 to 0.70 for interlaminar friction coefficients of at least some grain-oriented electrical steel sheets laminated in at least some planar portions, an average value thereof is 0.20 to 0.70, and the standard deviation of the magneto-striction λpp of the grain-oriented electrical steel sheets is $0.01\times10^{-6}$ to $0.10\times10^{-6}$, and therefore, the occurrence of noise caused by the combination of the steel sheets used and the shapes of iron cores can be effectively minimized.

INDUSTRIAL APPLICABILITY

According to each of the aspects of the present invention, in a wound core formed by laminating bent grain-oriented electrical steel sheets, it is possible to effectively minimize the generation of noise caused by the combination of the shape of the iron core and the steel sheets used. Accordingly, the industrial applicability is significant.

BRIEF DESCRIPTION OF THE REFERENCE SYMBOLS

1 Grain-oriented electrical steel sheet
2 Laminated structure
3 Corner portion
4 First planar portion (planar portion)
5 Bent portion
6 Joining part
10 Wound core main body

The invention claimed is:

1. A wound core comprising: a substantially rectangular wound core main body in a side view, wherein the wound core main body includes a portion in which grain-oriented electrical steel sheets in which planar portions and corner portions are alternately continuous in a longitudinal direction and an angle formed by two planar portions adjacent to each other with each of the corner portions therebetween is 90° are stacked in a sheet thickness direction and has a substantially rectangular laminated structure in a side view, wherein each of the corner portions has two or more bent portions having a curved shape in a side view of the grain-oriented electrical steel sheets, and the sum of bent angles of the bent portions present in one corner portion is 90°, wherein each bent portion in a side view has an inner side radius of curvature r of 1 mm to 5 mm, wherein the grain-oriented electrical steel sheets have a chemical composition containing, in mass %, Si: 2.0% to 7.0%, with the remainder comprising Fe and impurities, and a texture oriented in the Goss orientation, and wherein when interlaminar friction coefficients, which are dynamic friction coefficients between a plurality of two laminated grain-oriented electrical steel sheets facing each other, are measured at least at one of the planar portions of the wound core main body for a plurality of the two laminated grain-oriented electrical steel sheets having different positions in a thickness direction of the laminated structure, more than half of the measured interlaminar friction coefficients are 0.20 to 0.70, and an average value of all of the measured interlaminar friction coefficients is 0.20 to 0.70.

2. The wound core according to claim 1, wherein a standard deviation of magneto-striction λpp of the grain-oriented electrical steel sheets determined by a peak-to-peak value of the magneto-striction measured at the planar portions of each of a plurality of arbitrary grain-oriented electrical steel sheets taken out from the laminated grain-oriented electrical steel sheets is $0.01\times10^{-6}$ to $0.10\times10^{-6}$.

3. The wound core according to claim 1, wherein the interlaminar friction coefficient of the laminated grain-oriented electrical steel sheets in a region within 50% of the thickness of the laminated grain-oriented electrical steel sheets from an inner side of the wound core in the planar portions is 0.20 to 0.70.

* * * * *